United States Patent [19]

Farooq et al.

[11] Patent Number: 5,354,813
[45] Date of Patent: Oct. 11, 1994

[54] POLYMERIC MORDANTS FOR DYES AND THE LIKE

[75] Inventors: Omar Farooq, Woodbury; Mahfuza B. Ali, Mendota Heights, both of Minn.

[73] Assignee: Minnesota Mining and Manufacturing Company, St. Paul, Minn.

[21] Appl. No.: 179,377

[22] Filed: Jan. 10, 1994

Related U.S. Application Data

[62] Division of Ser. No. 30,630, Mar. 12, 1993, abandoned.

[51] Int. Cl.$^5$ ............................................. C08F 126/06
[52] U.S. Cl. ................................. 525/326.7; 526/263
[58] Field of Search ....................... 525/326.7; 526/263

[56] References Cited

U.S. PATENT DOCUMENTS

| | | | |
|---|---|---|---|
| 3,075,841 | 1/1963 | Lehman et al. | 96/77 |
| 3,271,148 | 9/1968 | Whitmore | 96/29 |
| 3,488,706 | 1/1969 | Cohen et al. | 96/39 |
| 3,547,649 | 12/1970 | Franco | 96/114 |
| 3,624,229 | 11/1971 | Timmerman et al. | 96/84 |
| 4,379,838 | 4/1983 | Helling et al. | 430/518 |
| 4,450,224 | 5/1984 | Klein et al. | 430/213 |
| 4,500,631 | 2/1985 | Sakamoto et al. | 430/413 |
| 4,695,531 | 9/1987 | Delfino et al. | 430/513 |
| 4,814,255 | 3/1989 | Vanmaele et al. | 430/213 |
| 4,820,608 | 4/1989 | Claeys et al. | 430/213 |
| 4,855,211 | 8/1989 | Janssens et al. | 430/213 |
| 5,134,198 | 7/1992 | Stofko, Jr. et al. | 525/205 |
| 5,156,675 | 10/1992 | Breton et al. | 106/22 |

FOREIGN PATENT DOCUMENTS

| | | |
|---|---|---|
| 783263 | 3/1971 | Belgium . |
| 931270 | 5/1971 | Italy . |
| 63-307979 | 12/1988 | Japan . |

OTHER PUBLICATIONS

D. W. Van Krevelin, *Properties of Polymers: Correlations with Chemical Structure*, Elsevier Publishing Co. (Amsterdam, London, New York, 1972), pp. 294–296.

Brownell, G. L., "Acids, Maleic and Fumaric", in *Enclyclopedia of Polymer Science and Technology*, vol. 1, John Wiley & Sons, Inc., New York: 1964), pp.. 67–95.

Hawley's Condensed Chemical Dictionary, 11th Edition, 1987, p. 938.

*Primary Examiner*—Joseph L. Schofer
*Assistant Examiner*—Wu C. Cheng
*Attorney, Agent, or Firm*—Gary L. Griswold; Walter N. Kirn; Gregory A. Evearitt

[57] ABSTRACT

Novel classes of polymeric mordants based upon poly(vinylpyridine), poly(N-vinylimidazoles), and poly(meth)acrylates are disclosed. The polymeric mordants contain N-heterocycles which are N-quaternized by different types of alkylated hydrazones, semicarbazones, and multiple-quaternized alkylated salts serving as pendant groups.

1 Claim, No Drawings

POLYMERIC MORDANTS FOR DYES AND THE LIKE

This is a division of application No. 08/030,630 filed Mar. 12, 1993, now abandoned.

FIELD OF THE INVENTION

This invention relates to polymeric mordants for dyes, inks, and the like and more particularly, it relates to various types of polymeric mordants based upon poly(vinylpyridines), poly(N-vinylimidazoles), and poly(meth)acrylates.

BACKGROUND OF THE ART

The basic polymeric mordants useful to mordant a dye in a hydrophilic colloidal layer between a base and a photographic emulsion layer disclosed in U.S. Pat. No. 4,695,531 comprise repeating units of formula:

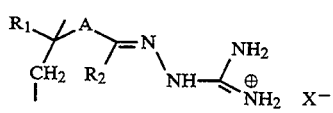

I wherein: $R_1$ is hydrogen or a methyl group; A is a —COO— or a —COO—alkylene group, e.g., —COOCH$_2$—, —COOCH$_2$CH$_2$—, —COOCHOHCH$_2$—; $R_2$ is a hydrogen or a lower alkyl group having from 1-4 carbon atoms; and X is an anion, e.g., acetate, oxalate, sulfate, chloride, or bromide. Mordant I can comprise units derived from vinylic monomers, for example, acrylates, acrylamides, vinylacetates, styrenes, vinyl ethers, vinyl ketones, vinyl alcohols, unsaturated chlorides, and nitriles with the proviso that such co-polymerizable units be in a quantity of 10–20% by weight. Similar mordants with the exclusion of A in I are also disclosed in GB Patent No. 850,281.

Polymeric mordants with N-heteroarocyclic vinyl aromatic, e.g., methylvinylpyridine (picoline) are also known in the art (see, for example, Italian Patent No. 931,270).

Polyvinylpyridine-based mordant, e.g., II

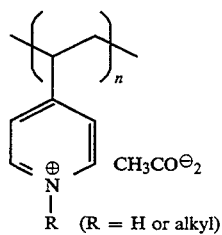

II (R = H or alkyl)

is also known in the art (see U.S. Pat. No. 4,695,531).

Non-diffusive mordants based on poly(N-vinylimidazolc) of the type III are known in the art (see U.S. Pat. No. 4,500,631) and have been used in certain radiographic image-forming processes wherein the mordants were coupled with water-soluble dyes.

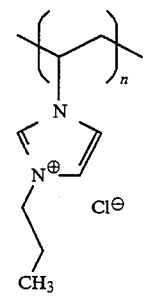

III

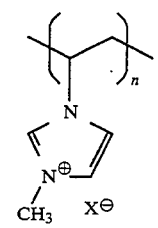

IV

X = I, p-MePhSO$_3$

Polymeric mordants of the type III as well IV are also disclosed in Japanese PubIn. No. 63-307979.

SUMMARY OF THE INVENTION

The present invention provides classes of novel polymeric mordants for dyes and the like. The inventive polymeric mordants are based upon poly(vinylpyridines), poly(N-vinylimidazoles), and poly(meth)acrylates.

In accordance with the present invention the following classes of inventive polymeric mordants are provided: (In all cases A to I, each X$^\ominus$ independently represents any anion or mixture of anions.)

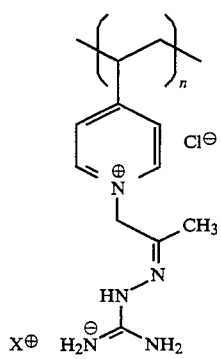

Class A wherein: X represents any anion, preferably CH$_3$SO$_3$, Br, NO$_3$, CI, CF$_3$COO, p-MePhSO$_3$, ClO$_4$, F, CF$_3$SO$_3$, BF$_4$, C$_4$F$_9$SO$_3$, FSO$_3$, PF$_6$, ClSO$_3$, or SbF$_6$; and n represents an integer of 2 or greater.

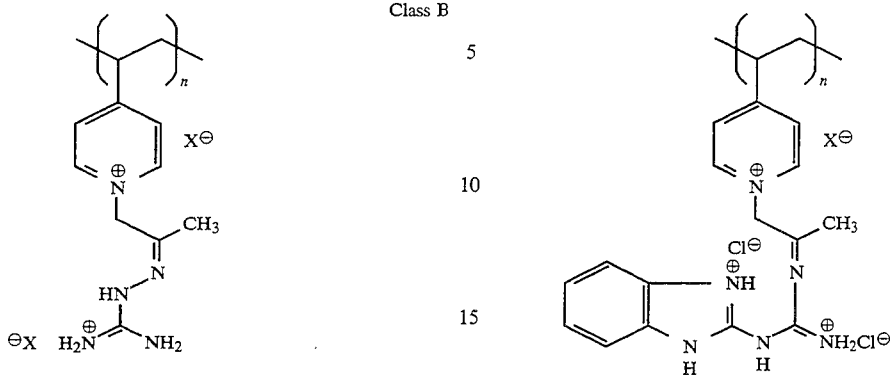

Class B wherein: X preferably represents CH$_3$SO$_3$, p-MePh-SO$_3$, CF$_3$SO$_3$, BF$_4$, PF$_6$, or SbF$_6$; and n represents an integer of 2 or greater.

Class C

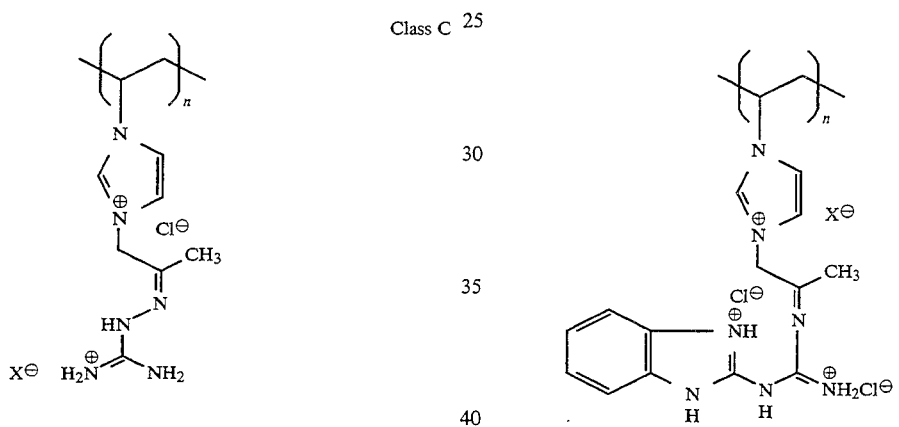

wherein: X preferably represents CH$_3$SO$_3$, Br, NO$_3$, Cl, CF$_3$COO, p-MePhSO$_3$, ClO$_4$, F, CF$_3$SO$_3$, BF$_4$, C$_4$F$_9$SO$_3$, FSO$_3$, PF$_6$, ClSO$_3$, or SbF$_6$; and n represents an integer of 2 or greater.

Class D

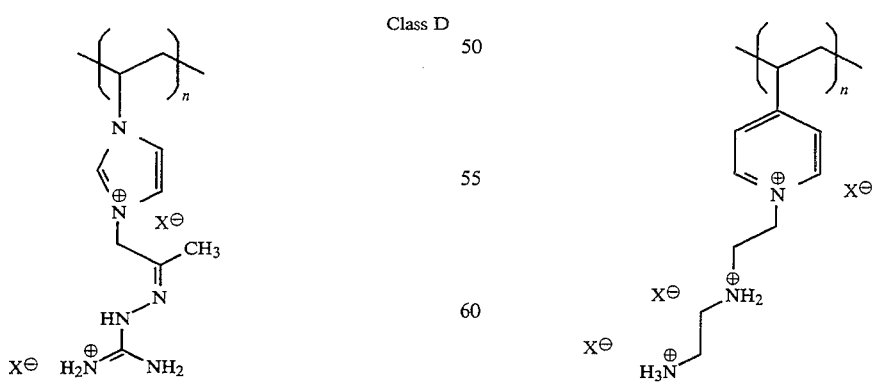

wherein: X preferably represents CH$_3$SO$_3$, p-MePh-SO$_3$, CF$_3$SO$_3$, BF$_4$, PF$_6$, or SbF$_6$; and n represents n integer of 2 or greater.

Class E wherein: X preferably represents the same counterions as recited for Class A earlier herein; and n represents an integer of 2 or greater.

Class F wherein: X preferably represents the same counterions as recited for Class A earlier herein; and n represents an integer of 2 or greater.

Class G wherein: X preferably represents the same counterions as recited for Class A earlier herein; and n represents an integer of 2 or greater.

Class H

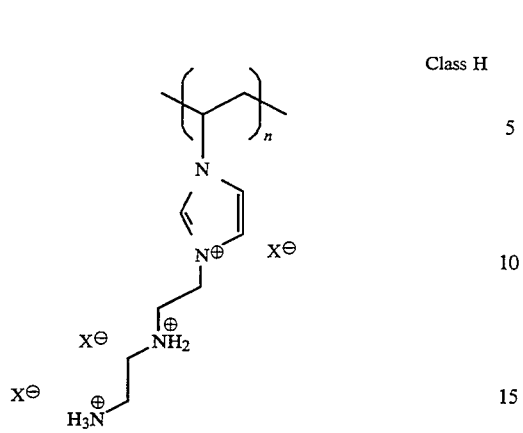

wherein: X preferably represents the same counterions as recited in Class A earlier herein; and n represents an integer of 2 or greater.

Class I

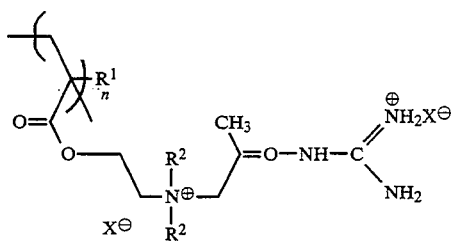

wherein: $R^1$ represents H or $CH_3$; $R^2$ represents a $C_1$-$C_4$ alkyl group; X preferably represents the same counterions as recited for Class A earlier herein; and n represents an integer of 2 or greater.

The inventive classes of polymeric mordants A to I are believed to be novel and not to have been previously disclosed in the literature. The inventive classes of polymeric mordants are useful in a variety of applications such as in ink-jet formulations to control or stop ink-bleeding into ink-jet and photographic films.

Other aspects of the present invention are apparent from the detailed description, the examples, and the claims.

DETAILED DESCRIPTION OF THE INVENTION

The synthesis of different polymeric mordants of Class A is shown in Reaction Scheme 1.

Reaction Scheme 1
Class A Materials

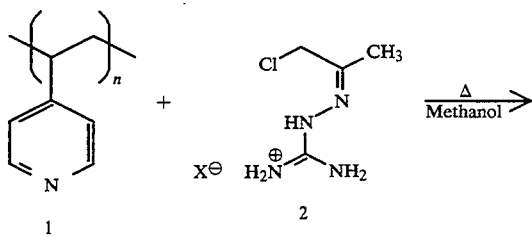

-continued
Reaction Scheme 1
Class A Materials

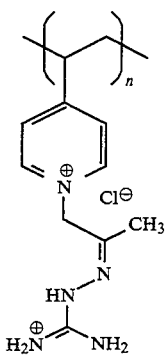

X:  a = $CH_3SO_3$    f = p-$MePhSO_3$    k-$C_4F_9SO_3$
    b = Br           g = $ClO_4$          l = $FSO_3$
    c = $NO_3$       h = F                m = $PF_6$
    d = Cl           i = $CF_3SO_3$       n = $ClSO_3$
    e = $CF_3COO$    j = $BF_4$           o = $SbF_6$

The following examples illustrate the preparation of the mordants in Class A.

EXAMPLE 1

These examples illustrate the preparation of poly(-vinylpyridines).

(a) A solution of 25 g 4-vinylpyridine in 50 ml methanol contained in a two-neck flask was flushed with dry nitrogen. After adding 0.5 g azobis-(isobutyronitrile), the system was refluxed for 24 hours when a viscous material resulted. The polymer was precipitated from ether/hexane and dried in vacuo. Molecular weight: $M_w$=140,609, $M_n$=50285, $P_d$=2.8

(b) The procedure in (a) was repeated for both 4-vinyl- and 2-vinylpyridines using THF instead of methanol. Poly(4-vinylpyridine) was precipitated from THF during the reaction whereas poly(2-vinylpyridine) was not. The latter was precipitated from ether/hexane as described above.

EXAMPLE 2

The following examples (with reference to Reaction Scheme 1) describe the preparations of various hydrazones from chloroacetone and appropriate salts of aminoguanidine.

(a) To a mixture of 30 g water and 30 g methanesulfonic acid, 20 g aminoguanidine bicarbonate was slowly added in portions at room temperature to obtain a clear solution of the corresponding methanesulfonate salt. The solution was warmed to about 40° C. and 15 ml chloroacetone was added dropwise. The solution was heated to about 50° C. for 15 minutes, cooled to room temperature, and then left at ice-temperature for 4-6 hours. The crystalline hydrazone was filtered and washed first with ice-cold isopropyl alcohol and then with diethyl ether. The hydrazone salt of methanesulfonate was dried in vacuo at about 60° C.

(b)-(h) The methanesulfonic acid in Example 2(a) was replaced successively by an equivalent amount of HBr, $HNO_3$, HCl, $CF_3COOH$, $pMePhSO_3H$, $HClO_4$, and HF and the procedure was repeated as described in 2(a) to obtain the hydrazone salts from (b)–(h).

(i) The methanesulfonic acid in Example 2(a) was replaced by trifluoromethanesulfonic (triflic) acid and the procedure was repeated as described in Example 2(a). The hydrazone salt, on overnight cooling, could be precipitated/crystallized, but was redissolved during filtration. The salt, however, was extracted in methylene chloride and then dried over anhydrous magnesium sulfate. Removal of solvent gave the hydrazone salt of trifluoromethanesulfonate as a thick liquid/semi-solid.

(j)–(o) The procedure in Example 2(i) was repeated by replacing the triflic acid by $HBF_4$, $C_4F_9SO_3H$, $FSO_3H$, $HPF_6$, $ClSO_3H$, and $HSbF_6$ to obtain the hydrazone salts from (j)–(o).

EXAMPLE 3

The following examples (with reference to Reaction Scheme 1) illustrate the preparation of various polymeric mordants.

(a) To a solution of 10 g poly(4-vinylpyridine) in 80 ml methanol, a solution of 21 g chloroacetonehydrazone-aminoguanidinium methanesulfonate (2a) in 30 g methanol was added and the mixture was heated to 50°–55° C. for 4–6 hours. On cooling the mixture to room temperature, the polymeric mordant with two counterions (first $Cl^-$ counterion with the ring quaternary nitrogen; second $CH_3SO_3^-$ counterion with the side chain iminium quaternary nitrogen) was precipitated from acetone, filtered, and dried in vacuo. The material is Polymeric dye Mordant $A(X=CH_3SO_3^-/Cl^-)$ (b)–(o) The procedure in (3a) was repeated using chloroacetonehydrazone-aminoguanidinium salts of counterions (b)–(o) to obtain the mordants from (b)–(o).

EXAMPLE 4

This example (with reference to Reaction Scheme 1) illustrates the preparation of a Polymeric Mordant of Class A wherein $X=Cl^-$.

(a) Preparation of vinyl pyridine polymer: a reaction vessel fitted with a condenser, a mechanical stirrer, a dropping funnel, and a nitrogen system was charged with 200 parts of 4-vinyl pyridine and 300 parts of isopropanol. The solution was purged with nitrogen for 10 min. then kept under a slow flow of nitrogen throughout the reaction. The solution was heated to 83° C. and then a solution of 2.0 parts of AIBN in 100 parts of isopropanol was added through the dropping funnel. The solution was heated at 83° C. for 5 hours. A quantitative polymerization reaction was obtained as evidenced by % solids and G.C. analysis. Molecular weight: $M_w=37,202$, $M_n=22,547$, $p=1.65$.

(b) Hydrazones from chloroacetone: a reaction vessel fitted with a mechanical stirrer and a condenser was charged with 162.5 parts of aminoguanidine hydrochloride $(NH_2—NH—C(NH_2)=N^{\oplus}H_2Cl^{\ominus}$ and 598.3 parts of methanol. The solid aminoguanidine hydrochloride was partially soluble in methanol. To the vessel 135.15 parts of chloroacetone was added and the solution was stirred for 1 hour at which time it became an homogeneous solution. A small portion of the reaction solution was taken out for analysis. I.R. and $^1H$ NMR spectra analysis revealed a quantitative reaction.

(c) Polymeric mordant A: a reaction vessel was fitted with a mechanical stirrer, a condenser and a dropping funnel. To the vessel a 20% solids solution of p-vinyl pyridine (20% solids solution was made by dilution of Example 4(a) with methanol) was charged, a 32.8% solids solution of hydrazones of chloroacetone from Example 4(b) was then added slowly from the dropping funnel with vigorous agitation. A solid polymeric product started to precipitate out immediately. After the completion of the addition of the all reactants, the mixture was stirred for 1 hour at room temperature. Then 500.0 parts of acetone was added and stirred for 10 min. The organic solvent was removed by vacuum suction. The solid product was washed with 500.0 parts of acetone and the acetone was removed by vacuum suction. The solid mordant was dissolved in deionized water to make 20% solids solution of the mordant.

The synthesis of different polymeric mordants of Class B is illustrated in Reaction Scheme 2.

Reaction Scheme 2
Class B Mordants

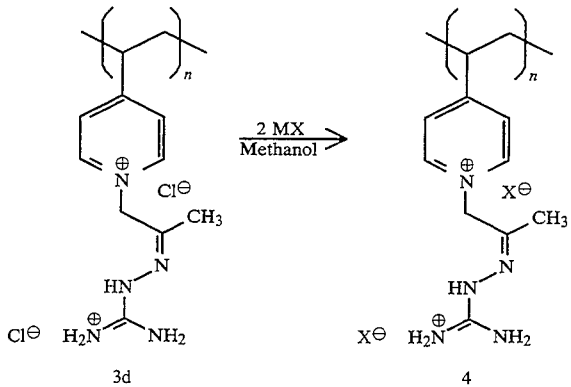

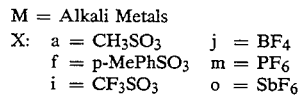

M = Alkali Metals
X: a = $CH_3SO_3$   j = $BF_4$
   f = p-MePhSO$_3$   m = $PF_6$
   i = $CF_3SO_3$   o = $SbF_6$ The following examples (with reference to Reaction Scheme 2) illustrate the preparation of various polymeric mordants of Class B.

EXAMPLE 5

To a solution of 10 g polymeric mordant 3d in 30 ml methanol, two equivalents of sodium methanesulfonate was added with stirring. The solution was heated to 60° C. for 15 mins, filtered, and the mordant 4a was precipitated from ether and dried in vacuo.

EXAMPLE 6

Mordants 4f–4o were prepared by the same procedure as in Example 5 by using appropriate equivalents of alkali metal salts of respective counterions.

Synthesis of different Class C mordants based on poly(N-vinylimidazole) is shown in Reaction Scheme 3.

Reaction Scheme 3
Class C Mordants

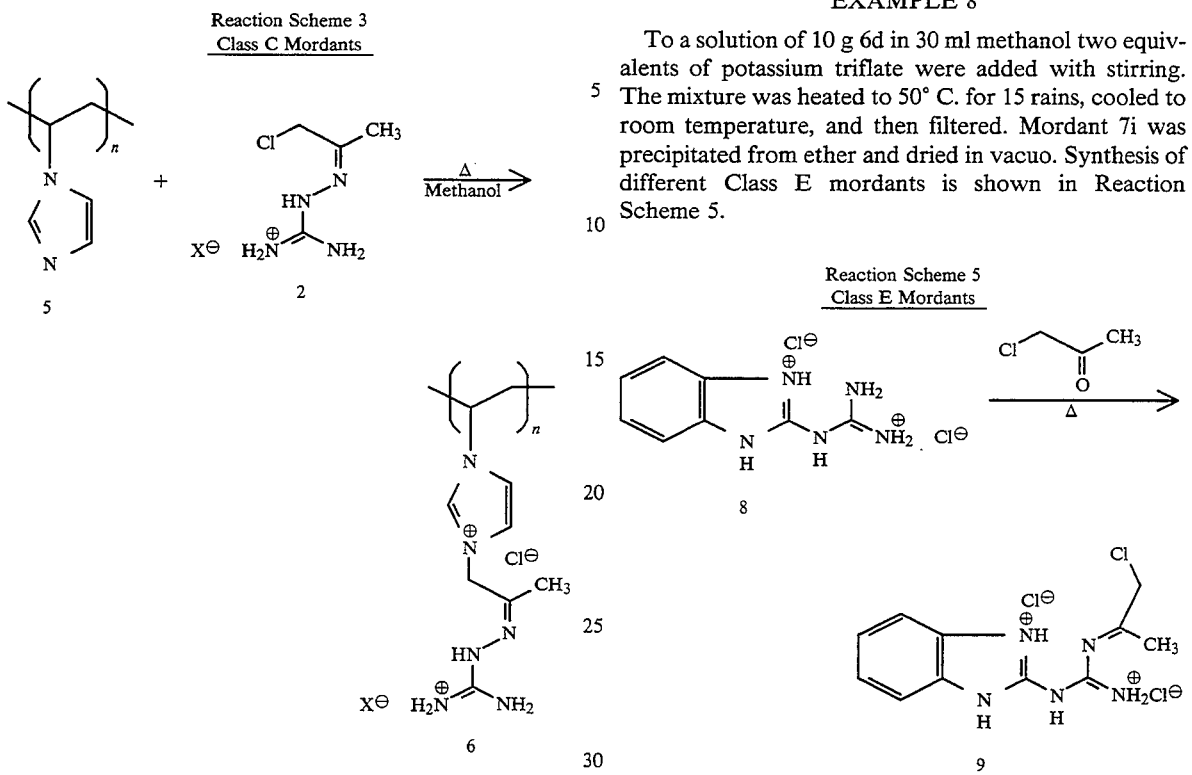

X represents the same counterions as in Reaction Scheme 1.

EXAMPLE 7

To a solution of 10 g poly(N-vinylimidazole) 5 in 30 ml methanol, a solution of 28 g chloroacetonehydrazone-aminoguanidinium trifluoroacetate 2e ($X=CF_3COO$) in 30 ml methanol was added. The mixture was heated to 50° C. for 15 min. and cooled to room temperature. Mordant 6e was precipitated from acetone or ether and dried in vacuo. Preparation of different Class D mordants is illustrated in Reaction Scheme 4.

Reaction Scheme 4
Class D Mordants

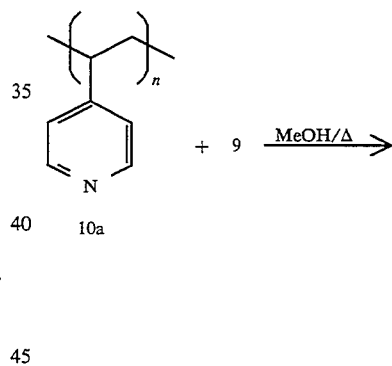

M = Alkali Metals
X:  a = $CH_3SO_3$   j = $BF_4$
    f = p-MePhSO$_3$   m = $PF_6$
    i = $CF_3SO_3$   o = $SbF_6$

EXAMPLE 8

To a solution of 10 g 6d in 30 ml methanol two equivalents of potassium triflate were added with stirring. The mixture was heated to 50° C. for 15 rains, cooled to room temperature, and then filtered. Mordant 7i was precipitated from ether and dried in vacuo. Synthesis of different Class E mordants is shown in Reaction Scheme 5.

Reaction Scheme 5
Class E Mordants

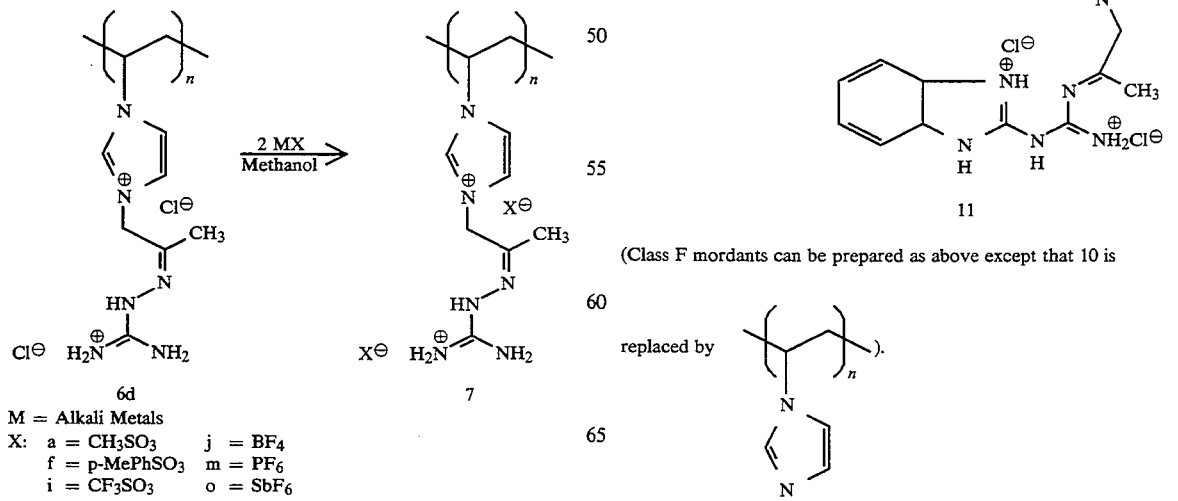

(Class F mordants can be prepared as above except that 10 is replaced by

![structure])
.

EXAMPLE 9

This example shows the preparation of multiple iminium component 9 (Reaction Scheme 5). To a suspension of 10 g guanidinobenzimidazole in 30 g water 13 g conc. HCI was added dropwise to obtain a di-quarternary iminium hydrochloride salt. To this mixture was added dropwise 3.3 ml chloroacetone on heating which was maintained for 0.5 hour. The off-white flocculent precipitate was separated from the mixture and dried in vacuo to obtain the diquarternary iminium hydrochloride as a semicarbazone salt.

EXAMPLE 10

(a) This example shows the preparation of Mordant 11. To a solution of 4 g poly(4-vinylpyridine) 10a in 30ml methanol was added a solution of 12 g 9 in 20ml methanol. The solution was heated to about 50° C. for 4 hours. The mordant was precipitated from acetone, filtered, and dried in vacuo.

(b) The procedure in 9 was repeated by replacing poly(4vinylpyridine) with poly(N-vinylimidazole) to obtain the corresponding mordant of Class F.

Synthesis of different Class G Mordants is shown in Reaction Scheme 6.

Reaction Scheme 6
Class G Mordants

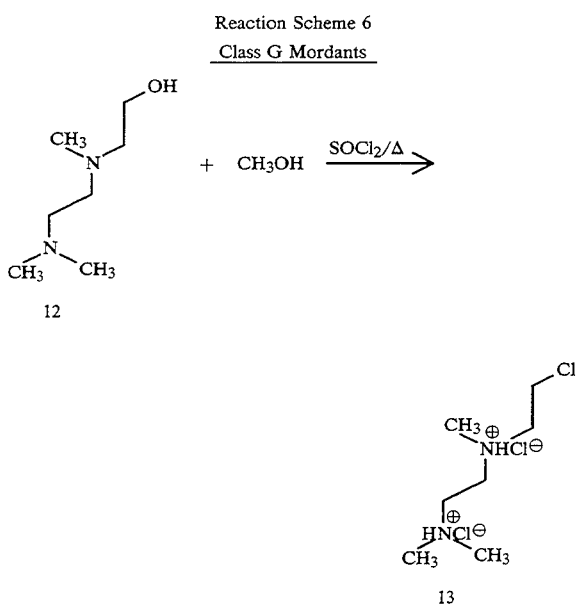

12

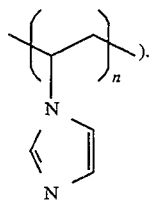

13

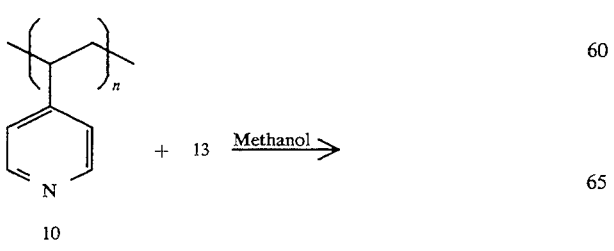

-continued
Reaction Scheme 6
Class G Mordants

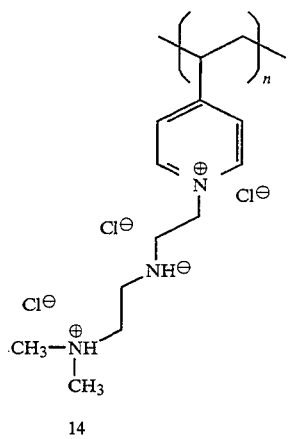

14

(Class H mordants can be prepared by replacing 10 with

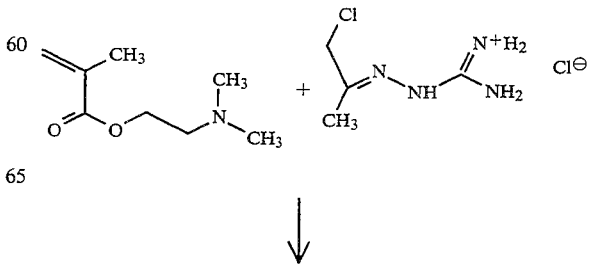
).

EXAMPLE 11

This example shows the preparation of a quarternary ammonium component. To a solution of 10 g 2-([2-(dimethylamino)ethyl]methylamino)ethanol and 2.2 g methanol in 25 ml methylene chloride was added dropwise 17 g thionyl chloride in 20 ml methylene chloride at ice temperature. The addition of thionyl chloride was followed by brief heating of the mixture for 0.5 hour. The white precipitate was filtered, washed with methylene chloride, and dried in vacuo. $^1$H NMR showed the material to be a di-quarternary ammonium salt of the starting material.

The synthesis of Class I mordants is illustrated in Reaction scheme 7.

Reaction Scheme 7
Class I Mordants

-continued
Reaction Scheme 7
Class I Mordants

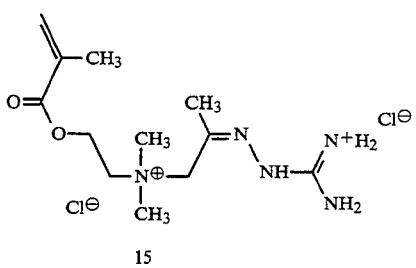

15

↓ V-50, H₂O

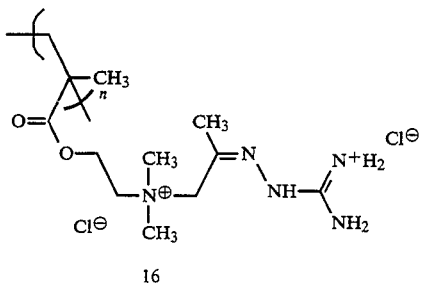

16

EXAMPLE 12

A reaction vessel fitted with a mechanical stirrer, a condenser, and a dropping funnel was charged with 100 parts of DMAEMA (N,N-dimethylaminoethyl methacrylate). A solution of 117.1 parts of chloroacetone hydrazone-aminoguanidinium hydrochloride in 285 parts of methanol was added to the vessel slowly from the dropping funnel in such a rate that the reaction exotherm does not exceed 50° C. After completion of the addition the reaction solution was stirred for two hours. Then the solvent was removed by rotary evaporation under vacuum at about 40° C. A white solid was obtained. Monomer 15 was characterized by its ¹H NMR spectrum.

In a reaction vessel 50 g of 15, 50 g water and 0.23 g of V-50 (2,2′-azobis(2-amidinopropane)di -hydrochloride), available from Wako Chemical Co. were mixed. The solution was purged for 20 rains. Then the solution was heated at 50° C. for 2 hours. A viscous polymer solution was obtained. Proton NMR spectrum and % solid analyses revealed quantitative polymerization of 15 to 16.

Reasonable modifications and variations are possible from the foregoing disclosure without departing from either the spirit or scope of the invention as defined in the claims.

What is claimed is:

1. A mordant comprising units of the following formula:

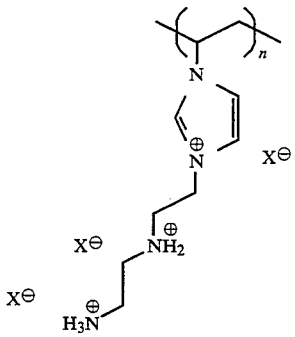

wherein: X represents an anion and n represents an integer of 2 or greater.

* * * * *